(12) United States Patent
Fuehrer et al.

(10) Patent No.: US 10,439,336 B2
(45) Date of Patent: Oct. 8, 2019

(54) PLUG CONNECTOR PART HAVING A TEMPERATURE SENSOR DEVICE

(71) Applicant: Phoenix Contact E-Mobility GmbH, Schieder-Schwalenberg (DE)

(72) Inventors: Thomas Fuehrer, Blomberg (DE); Markus Rose, Paderborn (DE); Bodo Finken, Bielefeld (DE)

(73) Assignee: PHOENIX CONTACT E-MOBILITY GMBH, Scheider-Schwalenberg (DE)

(*) Notice: Subject to any disclaimer, the term of this patent is extended or adjusted under 35 U.S.C. 154(b) by 0 days.

(21) Appl. No.: 15/501,456

(22) PCT Filed: Jul. 9, 2015

(86) PCT No.: PCT/EP2015/065688
§ 371 (c)(1),
(2) Date: Feb. 3, 2017

(87) PCT Pub. No.: WO2016/020133
PCT Pub. Date: Feb. 11, 2016

(65) Prior Publication Data
US 2017/0237205 A1 Aug. 17, 2017

(30) Foreign Application Priority Data
Aug. 6, 2014 (DE) .................. 10 2014 111 185

(51) Int. Cl.
*H01R 13/66* (2006.01)
*B60L 3/00* (2019.01)
(Continued)

(52) U.S. Cl.
CPC ........ *H01R 13/6683* (2013.01); *B60L 3/0023* (2013.01); *B60L 3/04* (2013.01);
(Continued)

(58) Field of Classification Search
CPC ..... H01R 13/6683; B60L 3/04; B60L 3/0023; B60L 11/1818
(Continued)

(56) References Cited

U.S. PATENT DOCUMENTS 5,995,350 A * 11/1999 Kopelman ............. H02H 5/047
361/103
6,210,036 B1 4/2001 Eberle et al.
(Continued)

FOREIGN PATENT DOCUMENTS

DE 202008009929 U1 12/2009
DE 102010045131 A1 3/2012
(Continued)

*Primary Examiner* — Edwin A. Leon
*Assistant Examiner* — Milagros Jeancharles
(74) *Attorney, Agent, or Firm* — Leydig, Voit & Mayer, Ltd.

(57) ABSTRACT

A plug connector part for connection to a mating plug connector part includes: at least one electrical contact element for carrying an electrical current and establishing electrical contact with at least one other contact element of a mating plug connector part; and a temperature sensor device for recording an increase in temperature of the plug connector part, the temperature sensor device including at least one sensor element, which is designed to detect infrared radiation emitted by the at least one electrical contact element.

12 Claims, 4 Drawing Sheets

(51) Int. Cl.
*B60L 3/04* (2006.01)
*B60L 53/16* (2019.01)

(52) U.S. Cl.
CPC ........... *B60L 53/16* (2019.02); *B60L 2240/36* (2013.01); *B60L 2240/529* (2013.01); *Y02T 10/7005* (2013.01); *Y02T 10/7072* (2013.01); *Y02T 90/14* (2013.01)

(58) Field of Classification Search
USPC .................................................. 439/620.22
See application file for complete search history.

(56) References Cited

U.S. PATENT DOCUMENTS

| | | | | |
|---|---|---|---|---|
| 7,808,760 | B2* | 10/2010 | Kopelman | G01J 5/58 361/103 |
| 8,325,454 | B2 | 12/2012 | Brugner et al. | |
| 2002/0137391 | A1* | 9/2002 | Berberich | H05K 1/162 439/620.22 |
| 2004/0184744 | A1* | 9/2004 | Uekawa | G02B 6/3636 385/93 |
| 2008/0013239 | A1 | 1/2008 | Kopelman | |
| 2010/0277325 | A1* | 11/2010 | Kopelman | G01J 5/58 340/595 |
| 2012/0212179 | A1 | 8/2012 | Nathan et al. | |
| 2013/0335024 | A1* | 12/2013 | Akai | H01M 10/44 320/109 |
| 2015/0171646 | A1* | 6/2015 | Pham | H02J 7/0029 320/109 |
| 2016/0104978 | A1* | 4/2016 | Chaumeny | H01R 13/6683 439/620.22 |
| 2017/0028862 | A1* | 2/2017 | Nagel | B60L 11/1818 |

FOREIGN PATENT DOCUMENTS

| | | |
|---|---|---|
| DE | 102012200523 A1 | 8/2012 |
| DE | 102012107902 A1 | 3/2014 |
| EP | 2605339 A1 | 6/2013 |
| GB | 2489988 A | 10/2012 |
| WO | WO 0213330 A1 | 2/2002 |
| WO | WO 2012146766 A1 | 11/2012 |
| WO | WO 2014032906 A1 | 3/2014 |

\* cited by examiner

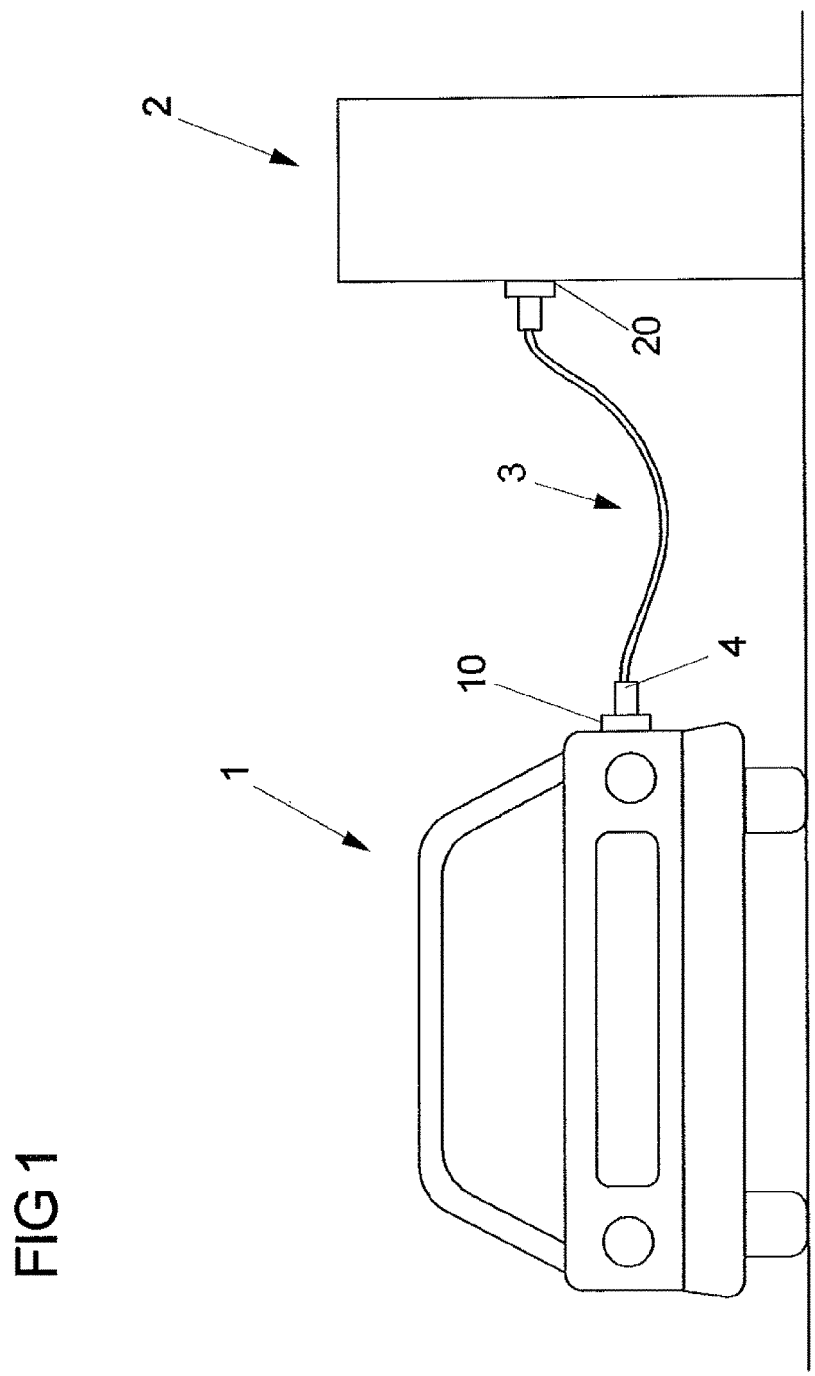

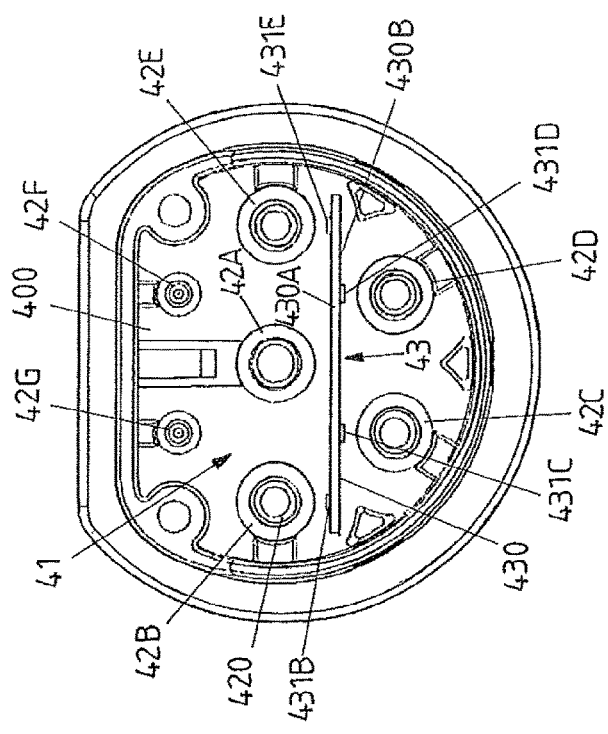
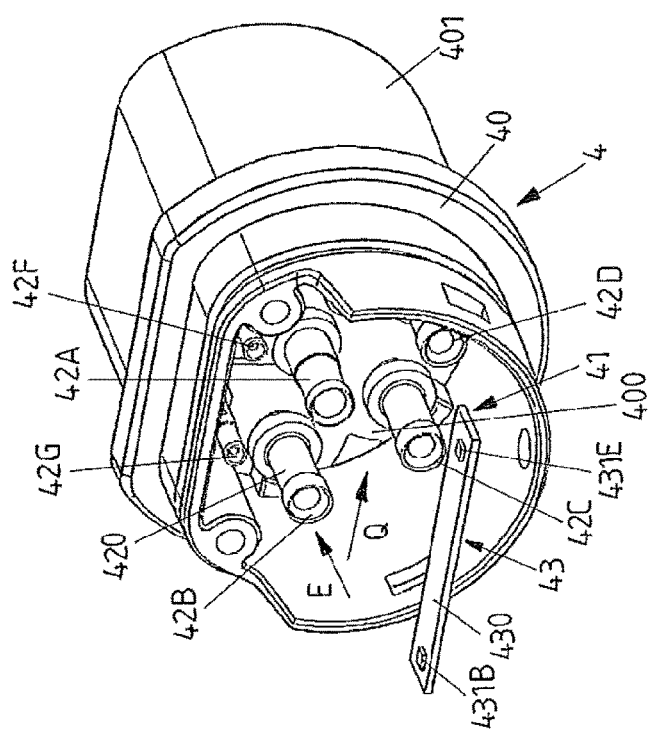
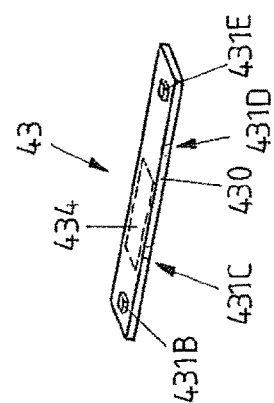

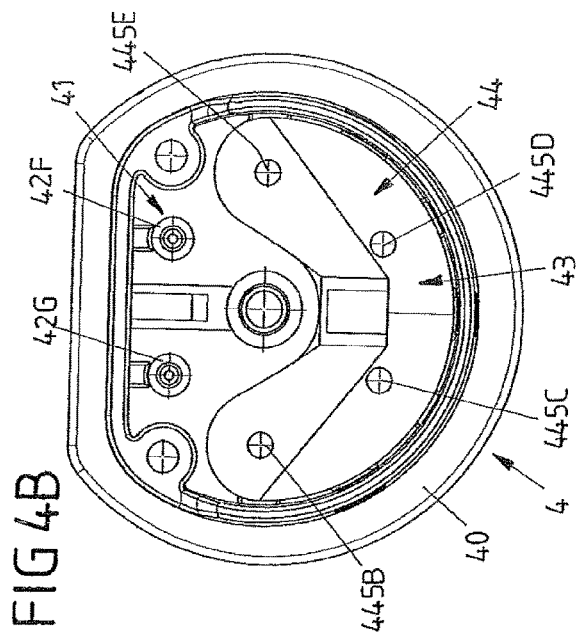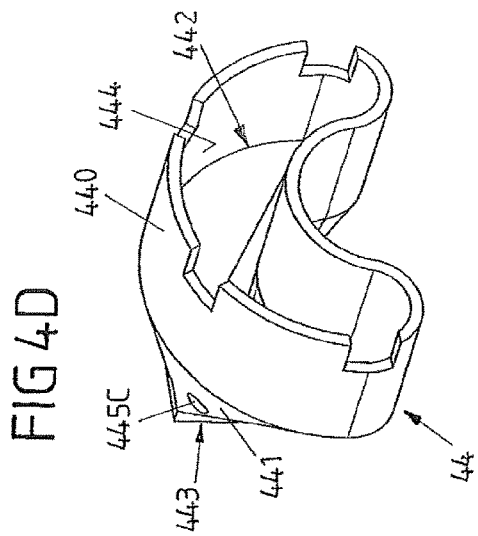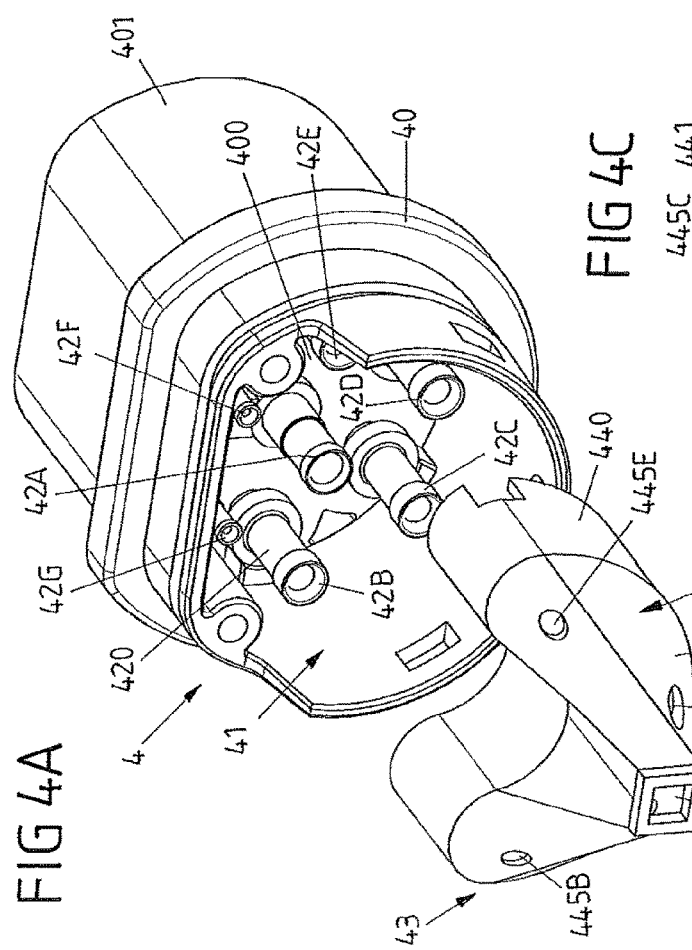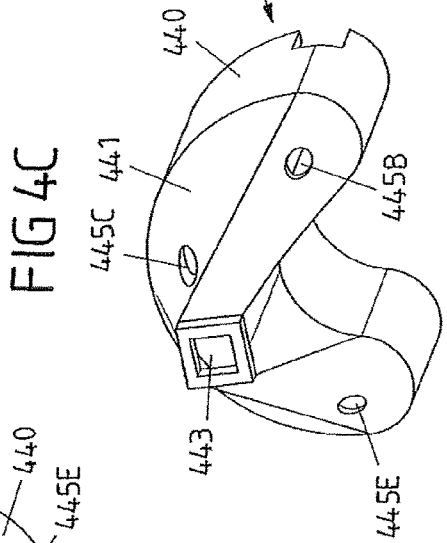

PLUG CONNECTOR PART HAVING A TEMPERATURE SENSOR DEVICE

CROSS-REFERENCE TO PRIOR APPLICATIONS

This application is a U.S. National Phase application under 35 U.S.C. § 371 of International Application No. PCT/EP2015/065688, filed on Jul. 9, 2015, and claims benefit to German Patent Application No. DE 10 2014 111 185.0, filed on Aug. 6, 2014. The International Application was published in German on Feb. 11, 2016 as WO 2016/020133 A1 under PCT Article 21(2).

FIELD

The invention relates to a plug connector part for connection to a mating plug connector part.

BACKGROUND

A plug connector part may include at least one electrical contact element for carrying an electrical current and for establishing electrical contact with at least one other contact element of a mating plug connector part, and a temperature sensor device for recording a rise in temperature of the plug connector part.

A plug connector part of this type can be used in particular on a charging device for transmitting a charging current. The plug connector part can in particular be formed as a charging plug for charging a motor vehicle driven by an electric motor (also referred to as an electric vehicle).

Charging plugs for charging electric vehicles are designed such that large charging currents can be transmitted. Since the thermal loss power increases quadratically with the charging current, the temperature of such charging plugs needs to be monitored in order to identify in good time when components of the charging plug are overheating and to modify the charging current or even to switch off the charging device if necessary.

In a charging plug known from EP 2 605 339 A1, a temperature sensor is arranged on an insulating body, approximately centrally between contact elements of the contact plug. The temperature sensor makes it possible to identify whether there is an excessive rise in temperature anywhere on the contact elements, in order to stop the charging process if necessary.

In a charging plug known from GB 2 489 988 A, a plurality of temperature sensors are provided which communicate temperature data via a line. A charging process is controlled depending on the temperature range in which the temperatures recorded at the temperature sensors lie.

U.S. Pat. No. 6,210,036 B1 discloses a plug connector, in which a plurality of temperature sensors are interlinked in series by means of a single-core line. The temperature sensors are arranged on an insulating body and have a significant change in resistance at a pre-determined temperature that is of such a degree that a control circuit connected to the line can detect the change and adapt the current flowing through the charging plug, cutting it off if necessary.

U.S. Pat. No. 8,325,454 B2 discloses a plug, in which individual contacts are associated with thermistors which are interconnected in parallel and conductively switch a thyristor when a threshold temperature is exceeded in order to thus switch off a current flowing through the contacts.

In charging plugs known from the prior art, temperature sensors are in particular embedded in an insulating body. This is required for electrically insulating the temperature sensors from the contact elements, the temperature of which may increase. However, this simultaneously entails the disadvantage that a change in temperature of one of the contact elements is transmitted via the insulating body with a time delay and is therefore sensed at the temperature sensors with a time delay. Particularly in concepts which are intended to make it possible to quickly disconnect a load circuit in the event of a fault, such temperature sensor arrangements are therefore sometimes unsuitable.

SUMMARY

In an embodiment, the present invention provides a plug connector part for connection to a mating plug connector part, comprising: at least one electrical contact element configured to carry an electrical current and to establish electrical contact with at least one other contact element of a mating plug connector part; and a temperature sensor device configured to record an increase in temperature of the plug connector part, the temperature sensor device comprising at least one sensor element configured to detect infrared radiation emitted by the at least one electrical contact element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 1 is a schematic view of an electric vehicle having a charging device connected thereto;

FIG. 2A is a perspective view of a plug connector part comprising a temperature sensor device;

FIG. 2B is a frontal view of the plug connector part according to FIG. 2A;

FIG. 2C is a separate view of the temperature sensor device;

FIG. 4A is a perspective view of a plug connector part comprising yet another embodiment of a temperature sensor device;

FIG. 4B is a frontal view of the plug connector part according to FIG. 4A;

FIG. 4C is a separate perspective view of a conducting element of the temperature sensor device; and FIG. 4D is another perspective view of the conducting element.

DETAILED DESCRIPTION

Figure 3B:
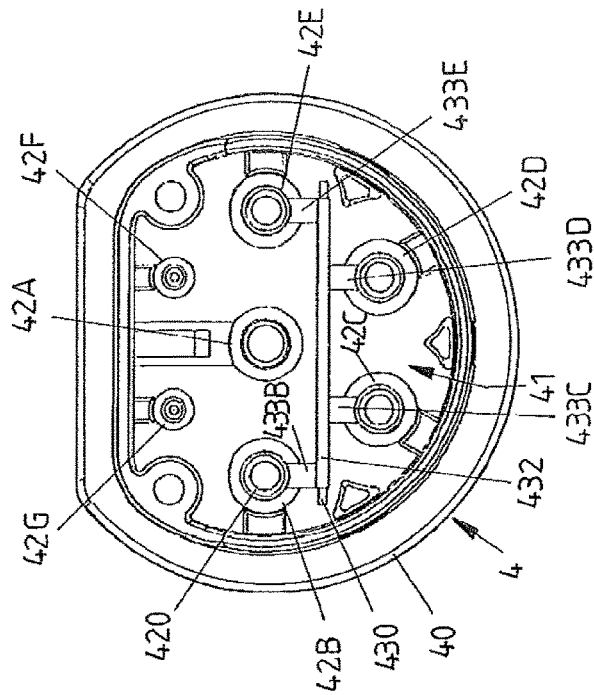
FIG. 3B is a frontal view of the plug connector part according to FIG. 3A.

Accordingly, the temperature sensor device comprises at least one sensor element which is designed to detect infrared radiation emitted by the at least one electrical contact element.

A basic concept of the present invention is that of using sensor elements which can identify an increase in temperature of at least one of the contact elements directly and without a significant time delay. Moving away from conventional concepts, in which in particular temperature-dependent resistors were used, sensor elements are intended to be used which are designed to detect infrared radiation emitted by one or more contact elements. The sensor elements are therefore radiation sensors which pick up electromagnetic radiation in particular in the infrared radiation range, having a wavelength of between 0.7 μm and 1,000 μm, in particular between 1 μm and 100 μm, for example between 3 μm and 50 μm.

Such sensor elements can be designed in the manner known in thermal imaging cameras, for example. The sensor elements are adapted to the wavelength range to be detected and output intensity information, which may be spatially resolved and indicates the intensity distribution in the wavelength range.

The plug connector part preferably comprises a plurality of contact elements, at least some of which are designed as power contacts for carrying currents having high current strengths. In particular, a rise in temperature of these contact elements acting as power contacts needs to be swiftly identified. For this purpose, a plurality of sensor elements can be provided, each of which is associated with an electrical contact element in order to detect infrared radiation emitted by the associated contact element.

Each sensor element is therefore arranged and designed to receive and detect in particular the infrared radiation emitted by the associated contact element in order to deduce an (excessive) rise in temperature of the associated contact element on the basis of the intensity of the received infrared radiation.

In order to provide an easy-to-handle assembly mounted on a housing of the plug connector part, the sensor elements can be arranged on a printed circuit board, for example, which is inserted into the housing of the plug connector part and can be fastened to the housing of the plug connector part. The sensor elements are preferably arranged on the printed circuit board offset from one another and are positioned on the printed circuit board in such a spatial position that each sensor element can receive the infrared radiation emitted by an associated contact element in order to deduce a rise in temperature of the associated contact element on the basis of the infrared radiation emitted.

The printed circuit board can, for example, be arranged between a plurality of contact elements, a first side of the printed circuit board facing towards first contact elements and a second side of the printed circuit board facing towards second contact elements. In accordance with assigning the sensor elements to the contact elements, some sensor elements are then arranged on the first side of the printed circuit board and other sensor elements are arranged on the second side of the printed circuit board such that each of the sensor elements is arranged so as to be opposite the associated contact elements on the printed circuit board, for example.

Together with the printed circuit board, an assembly of sensor elements can be provided which can, for example, also comprise electronic components for processing and evaluating sensor signals generated by the sensor elements. Together with the printed circuit board, an electronic system is therefore provided which can process the sensor signals from the individual sensor elements in order to record a maximum temperature of the contact elements, to store measured values, to calculate a maintenance interval, to predict risks and the like, for example.

In addition, it is also conceivable to connect an additional sensor element for recording the temperature outside the plug connector part to the printed circuit board, in order to determine a relative increase in temperature inside the plug connector part, taking into account the external temperature.

It is also conceivable and possible in this connection for the sensor elements to be arranged on more than one printed circuit board that are suitably interconnected. An assembly of a plurality of printed circuit boards having sensor elements arranged thereon is therefore provided, in which the printed circuit boards can be arranged inside the housing of the plug connector part in a flexible manner.

The printed circuit board is preferably plate-shaped and arranged along its extension plane in a housing of the plug connector part such that the printed circuit board extends in an insertion direction, in which the at least one contact element is brought into plugged engagement with at least one contact element of an associated mating plug connector part, and in a transverse direction that is transverse to the insertion direction. The printed circuit board therefore extends in a planar manner in the direction parallel to the contact elements, allowing for spatially expedient arrangement between the contact elements.

Since the sensor elements receive infrared radiation emitted by the contact elements, the sensor elements can be spatially separated and therefore at a spacing from the contact elements. The infrared radiation emitted by the contact elements is transmitted through the air to the sensor elements where it is detected. Since the sensor elements can be spaced apart from the contact elements, the contact elements and the sensor elements can be advantageously electrically insulated from one another, without an (additional) insulating body needing to be arranged between the contact elements and the sensor elements therefor.

In order to improve the pick-up of radiation at the sensor elements, it is also conceivable and possible for a conducting element for conducting infrared radiation from the contact element to the associated sensor element to be arranged between a contact element and an associated sensor element. The conducting element is transparent to the relevant infrared radiation range to be detected and conducts radiation to the sensor element that is emitted by the contact element and coupled into the conducting element. A conducting element of this type can be made of a glass material or any other material for conducting infrared radiation, for example.

Such a conducting element is not necessarily formed as a solid body, but can also be formed as a hollow body, for example, which comprises an inner wall that reflects infrared radiation. Such a conducting element can conduct infrared radiation in its interior from a contact element to an associated sensor element.

By using such a conductor element, it is in principle also possible to conduct infrared radiation from a plurality of contact elements to a single sensor element. In this case, a sensor element it associated with a plurality of contact elements, and therefore the infrared radiation can be received by a plurality of contact elements together, via the sensor element. Although this sometimes does not allow for the temperature of individual contact elements to be determined, the information alone regarding whether (wherever) the plug connector part is overheating is important in order to cut off a loading current, for example, and therefore, by evaluating all the received infrared radiation, it is possible to record whether any of the contact elements is possibly overheating by means of the one sensor element.

Such a conducting element which is associated with a plurality of contact elements can, for example, have an inner space into which a plurality of contact elements of the plug connector part extend. By means of the conducting element, infrared radiation emitted by the contact elements is conducted to one or may be even a plurality of sensor elements, so that the infrared radiation emitted by the contact elements can be received at the one or the plurality of sensor elements.

The inner space of the conducting element is preferably delimited by an inner wall which reflects infrared radiation. Such a conduction element can, for example, be made of plastics material and be provided with a reflective coating on its inner wall. However, it is also conceivable and possible for the conducting element to be made, for example, of a metal, for example steel or copper, and to be polished on its inner wall for advantageous reflection. In this case, a reflective coating can also be dispensed with.

The concept of arranging a plurality of sensor elements on a printed circuit board and therefore combining them to form an assembly is also applicable to sensor elements which are generally suited to recording a temperature of one or more contact elements and are not necessarily formed as infrared sensors.

For example, a plurality of sensor elements can be formed as temperature-dependent resistors, the resistance of which increases as the temperature increases, for example (PTC resistors). Such temperature-dependent resistors can have a non-linear characteristic curve such that the resistance value at the resistor increases in a non-linear manner when a threshold temperature is exceeded, and are made, for example, of a ceramic material that exhibits a (sharp), non-linear increase in resistance when a material-specific threshold temperature is exceeded.

Other temperature sensors in the form of electrical or electronic component parts which record a temperature of a contact element either directly or indirectly are also conceivable and possible.

When sensor elements formed for example as temperature-dependent resistors are used, conducting elements can be arranged between the contact elements and the sensor elements and are thermally conductive to the extent that any heat present at a contact element is conducted to an associated sensor element. The sensor element detects the heat and a corresponding sensor signal is issued.

FIG. 1 is a schematic view of a vehicle 1 in the form of a vehicle driven by an electric motor (referred to in the following as an electric vehicle). The electric vehicle 1 comprises electrically chargeable batteries, by means of which an electric motor can be supplied with electrical power to move the vehicle 1.

In order to charge the batteries of the vehicle 1, the vehicle 1 can be connected to a charging station 2 via a charging cable 3. For this purpose, one end of the charging cable 3 can be inserted into an associated charging socket 10 of the vehicle 1 by means of a plug connector part 4 and the other end thereof is electrically connected to a suitable charging socket 20 on the charging station 2. Charging currents having a comparatively high current strength are transmitted to the vehicle 1 via the charging cable 3.

A first embodiment of a plug connector part 4 in the form of a charging plug is shown in FIG. 2A to 2C. The plug connector part 4 comprises a housing 40 having a plug-in portion 401, which can be brought into plugged engagement with the associated charging socket 10 on the vehicle 1 (see FIG. 1). Contact elements 42A-42G, which are elongated in an insertion direction E, protrude into the plug-in portion 401 and are arranged on a base 400 of the housing 40 and can be brought into plugged engagement, in the insertion direction E, with associated contact pins of the charging socket 10 in a manner known per se.

On the back of the plug-in portion 401, the contact elements 42A-42G protrude into a housing chamber 41 of the housing 40 by means of shanks 420. The contact elements 42A-42G can be connected to associated electrical lines by means of their shanks 420.

Of the contact elements 42A-42G, the contact elements 42B-42E arranged in a semicircle around the central contact element 42A, which acts as a neutral conductor, act as power contacts for transmitting the (large) charging currents. Accordingly, these contact elements 42B-42E in particular can overheat when the resistance increases locally due to a material fault or a defect, for example, and thus high thermal power can be released locally.

In order to identify possible overheating of one of the contact elements 42B-42E, a sensor device 43 is provided which comprises a printed circuit board 430 and sensor elements 431B-431E arranged thereon. The sensor elements 431B-431E are arranged on the printed circuit board 430 such that they are each opposite an associated contact element 42B-42E (see FIG. 2B) and can therefore detect a possible rise in temperature of a contact element 42B-42E associated in each case.

In the embodiment shown, the printed circuit board 430 extends in an extension plane that is spanned by the insertion direction E and a transverse direction Q that is perpendicular to the insertion direction E. The printed circuit board 430 is plate-shaped and spatially arranged between the contact elements 42B-42E to be monitored, such that each of the sensor elements 431B-431E arranged on the printed circuit board 430 are opposite the associated contact elements 42B-42E and, in this case, are each at least approximately the same spacing from the associated contact elements 42B-42E.

The sensor elements 431B-431E are arranged on different sides 430A, 430B of the printed circuit board 430. In particular, the sensor elements 431B, 431E are arranged on the side 430A of the printed circuit board 430 that faces the contact elements 42B, 42E, while the sensor elements 431C, 431D are arranged on the other side 430B of the printed circuit board 430 that faces away and faces the contact elements 42C, 42D.

In the embodiment shown, each of the sensor elements 431B-431E is arranged at a spacing from the contact element 42B-42E associated in each case such that an air gap is formed between the contact elements 42B-42E and the sensor elements 432B-431E. In this way, the contact elements 42B-42E and the sensor elements 431B-431E are electrically insulated from one another, without an additional insulation body made of an electrically insulating material being required.

In the embodiment shown, the sensor elements 431B-431E are designed as infrared sensors for receiving infrared radiation emitted by the contact elements 42B-42E. The sensor elements 431B-431E receive the infrared radiation emitted by the contact elements 42B-42E and convert this into intensity information, which can be used to deduce the temperature of the contact elements 42B-42E.

Since each sensor element 431B-431E is associated with precisely one contact element 42B-42E and is opposite the associated contact element 42B-42E, meaning they (predominantly) receive infrared radiation from the associated contact element 42B-42E, the temperature of the individual contact elements 42B-42E can be separately detected and monitored by means of the sensor device 43. In order to evaluate sensor signals obtained by the sensor elements 431B-431E, an electronics device 434 can be arranged on the printed circuit board 430 (shown schematically in FIG. 2C) and is used to process the sensor signals and determines the current maximum temperature of the individual contact elements 42B-42E, stores temperature values over time, calculates maintenance intervals, makes predictions and the like, for example.

The electronics device 434 may also additionally be connected to an external temperature sensor for recording the ambient temperature, in order to include the ambient temperature in the evaluation and to determine a relative increase in temperature of the plug connector part 4, for example.

Figure 3A:
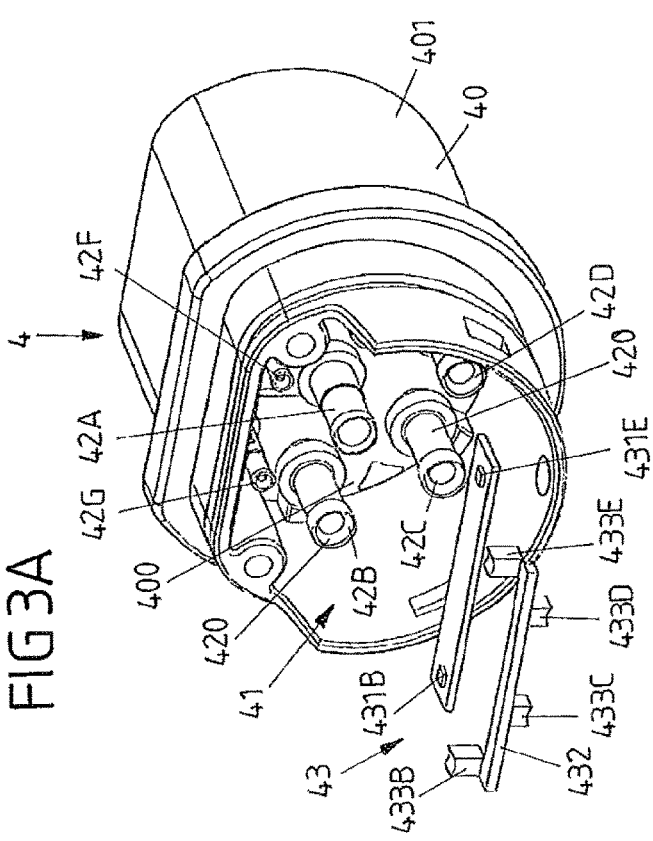
FIG. 3A is a perspective view of a plug connector part comprising another embodiment of a temperature sensor device.
Figure 3C:
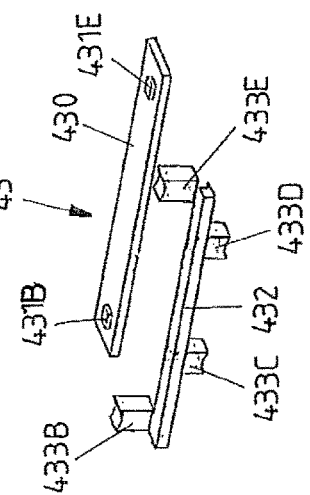
FIG. 3C is a separate view of the temperature sensor device.

A modified embodiment is shown in FIG. 3A to 3C.

The plug connector part 4 in this embodiment has the same basic construction as the plug connector part 4 in the embodiment according to FIG. 2A to 2C. In contrast to the plug connector part according to FIG. 2A to 2C, in the plug connector part 4 according to FIG. 3A to 3C, a support element 432 comprising conducting elements 433B-433E arranged thereon is also provided on the temperature sensor device 43 and is arranged on the printed circuit board 430 and is used to conduct infrared radiation from the contact elements 42B-42E to the individual sensor elements 431B-431E by means of its conducting elements 433B-433E. Each conducting element 433B-433E is arranged in particular between a contact element 42B-42E and the associated sensor element 431B-431E such that infrared radiation is conducted from the contact element 42B-42E to the associated sensor element 431B-431E (see FIG. 3B in conjunction with FIG. 3C).

The conducting elements 433B-433E are made of a material that is transparent for infrared radiation in the relevant wavelength range to be detected, and are used to conduct the radiation.

In other respects, the embodiment according to FIG. 3A to 3C has the same function as the embodiment according to FIG. 2A to 2C, and therefore reference is intended to be made to the aforementioned explanations.

In the embodiments according to FIGS. 2A to 2C and 3A to 3C, sensor elements 41 which are not formed as infrared sensors but as temperature sensors, for example, in particular temperature-dependent resistors, can in principle also be used.

In this case, the conducting elements 433B-433E in the embodiment according to FIG. 3A-3C are optimized for thermal conduction (and not for conducting infrared radiation), in order to conduct heat from a contact element 42B-42E to an associated sensor element 431B-431E.

Such a temperature-dependent resistor has, for example, a resistance that increases with the temperature (PTC resistor). Such a temperature-dependent resistor can, for example, have a non-linear characteristic curve such that the resistance at the resistor increases in a non-linear and abrupt manner when a temperature threshold is exceeded.

Another embodiment of a plug connector part 4 is shown in FIG. 4A to 4D.

Whilst the housing 40, the plug-in portion 401 and the contact elements 42A-42C of the plug connector part 4 are the same as in the embodiments according to FIGS. 2A to 2C and 3A to 3C, in the embodiment according to FIG. 4A to 4D, the temperature sensor device 43 comprises a conducting element 44, the basic external shape of which is funnel-shaped and which is arranged on the contact elements 42B-42E acting as power contacts such that the contact elements 42B-42E extend into an inner space 442 of the conducting element 44 and are held between the conducting element 44 and the base 400 of the housing 40 by their shanks 420.

The conducting element 44 comprises an attachment portion 440 which surrounds the inner space 442 and extends around the shanks 420 of the contact elements 42B-42E. A tapered portion 441 adjoins the attachment portion 440 and opens into an opening 443 to which an individual sensor element 431 is attached.

An inner wall 444 of the attachment portion 440 and of the tapered portion 441 that faces the inner space 442 is, for example, provided with a coating that reflects infrared radiation or is generally designed such that the inner wall 444 reflects infrared radiation in the relevant wavelength range.

The conducting element 44 is of such a shape that all the infrared radiation from the contact elements 42B-42E is conducted towards the individual sensor element 431 arranged on the opening 443, in order to be received thereby. By means of the sensor element 431, infrared radiation is therefore received by all the contact elements 42B-42E inside the conducting element 44, and therefore the temperature information as a whole can be obtained by all the contact elements 42B-42E via the sensor element 431.

Through-openings 445B-445E are arranged on the tapered portion 441 of the conducting element 44, through which lines for electrically connecting the contact elements 42B-42E can be carried.

The conducting element 44 can be made of plastics material or of a metal material, for example. If the conducting element 44 is made of plastics material, a coating for reflecting infrared radiation is preferably provided on the inner wall 444. If the conducting element 44 is made of metal, the inner wall 444 can be polished, for example, and a coating can also be dispensed with.

The basic concept of the invention is not limited to the embodiments described above, but rather can also be implemented in a completely different manner.

By using sensor elements, in particular, for recording infrared radiation, a change in temperature of one or of a plurality of contact elements can be swiftly identified so that countermeasures, for example cutting off a charging current, can be quickly taken. Since a defect can result in an increase in temperature of a contact element by several 100° C. within a matter of seconds, this rapid cutting off makes it possible to avoid substantial damage.

A plug connector part of the type described here is not necessarily formed as a charging plug, but can be used in other ways. The measures described can generally be used for plug connectors in order to establish an electrical connection.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 vehicle
10 charging socket
2 charging station
20 charging socket
3 charging cable
4 plug connector part
40 housing
400 base
401 plug-in portion
41 housing chamber
42A-42G contact element (contact connector)
43 temperature sensor device
430 printed circuit board
430A, 430B side
431, 431B-431E sensor element
432 support element
433B-433E conducting element
434 electronic device
44 conducting element
440 attachment portion
441 tapered portion
442 inner space
443 opening
444 inner wall
445B-445E through-opening
E insertion direction
Q transverse direction
420 shank

The invention claimed is:

1. A plug connector part for connection to a mating plug connector part, comprising:
a plurality of electrical contact elements configured to carry an electrical current and to establish electrical contact with other contact elements of the mating plug connector part; and
a temperature sensor device configured to record a rise in temperature of the plug connector part, the temperature sensor device comprising a plurality of sensor elements and a printed circuit board on which the plurality of sensor elements are arranged, each of the sensor elements being associated with one of the contact elements to detect an increase in temperature of the associated contact element,
wherein the sensor elements are configured to detect infrared radiation emitted by the contact elements, and
wherein conducting elements configured to conduct infrared radiation to the sensor elements are arranged between each sensor element and the associated contact element such that a number of the conducting elements is equal to a number of the sensor elements and a number of the contact elements.

2. The plug connector part according to claim 1, wherein each of the plurality of sensor elements is configured to detect infrared radiation in a wavelength range of between 0.7 μm and 1000 μm.

3. The plug connector part according to claim 2, wherein each of the plurality of sensor elements is configured to detect infrared radiation in a wavelength range of between 1 μm and 100 μm.

4. The plug connector part according to claim 1, wherein the sensor elements are disposed on the printed circuit board so as to be offset from one another.

5. The plug connector part according to claim 1, wherein the printed circuit board extends in a shape of a plate along an extension plane, which is spanned by an insertion direction in which each of the plurality of contact elements is configured to be brought into plugged engagement with at least one other contact element, and a transverse direction.

6. The plug connector part according to claim 1, wherein the plurality of sensor elements are spatially spaced apart from the plurality of contact elements such that at least one sensor element of the plurality of sensor elements is configured to receive infrared radiation emitted by at least one contact element of the plurality of contact elements via an air interface.

7. The plug connector part according to claim 1, wherein a conducting element configured to conduct infrared radiation from the at least one contact element to the at least one sensor element is disposed between the at least one sensor element and the at least one contact element.

8. The plug connector part according to claim 7, wherein the conducting element comprises an inner space, into which the plurality of contact elements of the plug connector part extend, the conducting element being configured to conduct infrared radiation emitted by at least one contact element of the plurality of contact elements to at least one sensor element of the plurality of sensor elements.

9. The plug connector part according to claim 8, wherein the conducting element comprises an inner wall which delimits the inner space and is configured to reflect infrared radiation.

10. The plug connector part according to claim 9, wherein the inner wall comprises a reflective coating.

11. The plug connector part according to claim 1, wherein the sensor elements comprise temperature sensors configured to record a change in temperature of the contact elements.

12. The plug connector part according to claim 11, wherein a conducting element configured to conduct heat is arranged between each sensor element and the associated contact element.

* * * * *